United States Patent
Hojo et al.

[11] Patent Number: 6,137,655
[45] Date of Patent: *Oct. 24, 2000

[54] CASSETTE ADAPTOR WITH ADJUSTABLE MAGNETIC HEAD

[75] Inventors: Atsushi Hojo, Nara; Hiroshi Yoshiya, Fujiidera, both of Japan

[73] Assignee: Matsushita Electric Industrial Co., Ltd., Osaka-fu, Japan

[*] Notice: This patent is subject to a terminal disclaimer.

[21] Appl. No.: 09/097,069

[22] Filed: Jun. 12, 1998

[30] Foreign Application Priority Data

Jun. 16, 1997 [JP] Japan ................................ 9-158378

[51] Int. Cl.$^7$ .......................... G11B 31/00; G11B 5/105; H04B 1/20
[52] U.S. Cl. .......................... 360/137; 360/128; 360/290; 369/2; 369/289
[58] Field of Search .................................... 360/137, 129, 360/104, 105, 109, 130.21, 132, 290; 369/2, 289

[56] References Cited

U.S. PATENT DOCUMENTS

| | | | |
|---|---|---|---|
| 3,700,826 | 10/1972 | O'Neal | 360/137 |
| 4,071,864 | 1/1978 | Zapala | 360/104 |
| 4,287,388 | 9/1981 | Beer et al. | 360/137 |
| 4,734,897 | 3/1988 | Schotz | 360/137 |
| 5,018,034 | 5/1991 | Tanaka et al. | 360/109 |
| 5,159,182 | 10/1992 | Eisele | 360/137 |
| 5,357,390 | 10/1994 | Vollmann | 360/130.21 |
| 5,586,090 | 12/1996 | Otte | 369/2 |
| 5,737,158 | 4/1998 | Tanaka et al. | 360/130.21 |
| 5,910,866 | 6/1999 | Shiomoto | 360/104 |
| 5,969,918 | 10/1999 | Yoshiya et al. | 360/137 |

*Primary Examiner*—Craig A. Renner
*Attorney, Agent, or Firm*—Akin, Gump, Strauss, Hauer & Feld, L.L.P.

[57] ABSTRACT

A cassette adaptor is disclosed, in which a head holder unit comprises a head holder for holding a magnetic head and a dummy tape frame having dummy tape members, and pins of the dummy tape frame are inserted into holes of the head holder thereby to fasten each other. When a cassette holder is inserted into the cassette tape reproduction apparatus, a tape guide of the cassette tape reproduction apparatus and the dummy tape members engage with each other, and the magnetic head moves to a position in opposed relationship with the reproduction head of the cassette tape reproduction apparatus in response to this engagement.

9 Claims, 13 Drawing Sheets

(a)

(b)

(a)

(b)

CASSETTE ADAPTOR WITH ADJUSTABLE MAGNETIC HEAD

BACKGROUND OF THE INVENTION

The present invention relates to a cassette adaptor for inputting from an external equipment a signal stored in a recording medium other than a cassette tape, in audio equipment mounted on a vehicle where cassette tapes are or has been mainly used.

Among vehicle-mounted audio equipment, the cassette tape recording apparatus is used on many vehicles as audio equipment as popular as the radio tuner. In recent years, with the extended use of compact discs (CD), compact disc reproduction apparatuses are in increasing demand as audio equipments, which are mounted in luxury vehicles. The compact disc reproduction apparatus, however, has so far been difficult to be mounted on an automobile as an additional equipment unless having originally included in the standard equipment of the new automobile. Also the compact disc reproduction apparatus is expensive as compared to the cassette tape reproduction apparatus. For these reasons, the widespread use of the compact disc reproduction apparatus for use on automotive vehicles has been hampered.

Therefore, for listening to music etc. from a compact disc in a vehicle not equipped with a compact disc reproduction apparatus, a portable compact disc reproduction apparatus has been brought into the vehicle and connected with a cassette tape reproduction apparatus of the vehicle-mounted audio equipment for reproduction. Generally, the vehicle-mounted audio equipment has no input terminal for additional equipment, and therefore a cassette adaptor has been used as input means for the signal from the compact disc reproduction apparatus.

In this signal input method using the cassette adaptor, which receives the output signal from the compact disc reproduction apparatus, the cassette adaptor is inserted into a cassette tape insertion slot of the cassette tape reproduction apparatus constituting the vehicle-mounted audio equipment. By inserting the cassette adaptor into a cassette tape insertion slot, the magnetic head incorporated in the cassette adaptor is brought into vicinity of the reproduction head of the cassette tape reproduction apparatus, so that output signal from the compact disc reproduction apparatus leaks from the magnetic head of the cassette adaptor and is transmitted to the reproduction head of the cassette tape reproduction apparatus. As a result, output signal from the portable compact disc reproduction apparatus is input through the cassette adaptor to the vehicle-mounted audio equipment and is reproduced.

An example of the prior art described above is a signal input method disclosed in a Japanese Examined Patent Application, Publication No. HEI-4-56391.

FIG. 12 is a plan view of the conventional cassette adaptor disclosed in the Japanese Examined Patent Application, Publication No. HEI-4-56391. A housing 112 of a cassette adaptor 110 shown in FIG. 12 has substantially the same shape as a housing (cassette case) of the cassette tape. Mounted in an opening 126 in the front face (the lower surface in FIG. 12) of the housing 112 is a 2-channel magnetic head 140. A two-core cable 142 is led out of a notch 146 of the housing 112. An end of the cable 142 is connected to an audio circuit in the housing 112, and the other end is terminated with a plug 144. The plug 144 is configured to be connected to a headphone jack for a compact disc reproduction apparatus not shown. FIG. 13 is an electrical circuit diagram showing an audio circuit disposed in the housing 112.

When listening to music or the like in a vehicle from a compact disc using the conventional cassette adaptor 110 configured as described above, the plug 144 at the other end of the cable 142 is connected to the headphone jack of the compact disc reproduction apparatus. Then the cassette adaptor 110 is inserted into a cassette tape insertion slot of the cassette tape reproduction apparatus mounted on the vehicle. A magnetic head 140 of the cassette adaptor 110 inserted in the cassette tape insertion slot is disposed to oppose a reproduction head 150 of the cassette tape reproduction apparatus. When the compact disc reproduction apparatus is played under such a condition as described above, output signal therefrom is input to the audio circuit shown in FIG. 13 via the cable 142, and is fed to the magnetic head 140. Since the magnetic head 140 is disposed to oppose the reproduction head 150 of the cassette tape reproduction apparatus, the signal input to the magnetic head 140 is sent to the reproduction head 150 of the cassette tape reproduction apparatus.

In case that a compact disc is played by using the conventional cassette adaptor configured as described above, the signal is transmitted most efficiently when the head gap is smallest between the magnetic head 140, which outputs the signal, and the reproduction head 150 of the cassette tape reproduction apparatus, which receives the signal. In case that the centers of the two heads are displaced from each other along the tape running direction, however, the signal transmission efficiency is significantly degraded. Also in case that the heights of the two head cores of the two heads which determine the positions of the tracks on which the tape runs do not agree with the tape width direction, not only the signal transmission efficiency between the heads is degraded but also crosstalk of the reproduced sound from the left channel to the right channel occurs when, for example, the magnetic head on the transmitting side of the left channel approaches the reproduction head of the right channel.

BRIEF SUMMARY OF THE INVENTION

The present invention aims to solve the problems of the conventional cassette adaptor described above, and has an object of providing a cassette adaptor which is capable of aligning the magnetic head on the transmission side in the traverse direction of the tape with the tape running position of the reproduction head of the cassette tape reproduction apparatus, and to accurately align the positions of the two heads in the tape running direction.

In order to achieve the above-mentioned object, a cassette adaptor of the present invention comprises:

- a housing having a shape mountable interchangeably with an ordinary cassette tape reproduced in a cassette tape reproduction apparatus;
- a magnetic head for outputting a signal, which is held swingably at substantially the center of a reproduction head insertion opening of the housing, and which transmits signals to a cassette tape reproduction head of the cassette tape reproduction apparatus;
- a head holder, which accommodates the magnetic head to have a predetermined positional relationship with the housing, which is disposed outside of an end of an opening into which a reproduction head of the cassette tape reproduction apparatus is inserted, and which has tape guides disposed nearer to the magnetic head side than an end of an opening into which a pinch roller of the cassette tape reproduction apparatus is to be inserted; and a dummy tape frame, which has dummy tape members which fit to the tape guide formed on the right and left sides of a front surface of the magnetic head, and which is fixed to the head holder; wherein the tape guides of the cassette tape reproduction apparatus and the dummy tape members engage with each other when the cassette adaptor is inserted into the cassette tape reproduction apparatus, and the magnetic head moves to a position in opposed relationship with the reproduction head of the cassette tape reproduction apparatus.

With the cassette adaptor according to this aspect of the present invention being configured as described above, the dummy tape members are inserted into the tape guide of the mating reproduction head when the cassette adaptor is inserted into the cassette tape reproduction apparatus, and is guided by the tape guide to be accurately positioned in the direction of tape width with respect to the reproduction head. Also the cassette adaptor according to the present invention allows it to easily align the magnetic tape and the dummy tape members during assembly.

A cassette adaptor of another aspect of the present invention comprises:

a housing having a shape mountable interchangeably with an ordinary cassette tape reproduced in a cassette tape reproduction apparatus;

a magnetic head for outputting a signal, which is held swingably at substantially the center of a reproduction head insertion opening of the housing, and which transmits signals to a cassette tape reproduction head of the cassette tape reproduction apparatus;

a head holder, which accommodates the magnetic head to have a predetermined positional relationship with the housing, which is disposed outside of an end of an opening into which a reproduction head of the cassette tape reproduction apparatus is inserted, and which has tape guides disposed nearer to the magnetic head side than an end of an opening into which a pinch roller of the cassette tape reproduction apparatus is to be inserted; and an endless dummy tape, which has the same width as the tape width of the ordinary cassette tape, and which is disposed in front of the magnetic head at a position being regulated in the tape width direction by the tape guides; wherein the tape guides of the cassette tape reproduction apparatus and the dummy tape engage with each other when the cassette adaptor is inserted into the cassette tape reproduction apparatus, and the magnetic head moves to a position in opposed relationship with the reproduction head of the cassette tape reproduction apparatus.

With the cassette adaptor according to this aspect of the present invention being configured as described above, the dummy tape is inserted into the tape guide of the mating reproduction head when the cassette adaptor is inserted into the cassette tape reproduction apparatus, and is guided by the tape guide to be accurately positioned in the tape width direction of the tape with respect to the reproduction head.

A cassette adaptor of still another aspect of the present invention comprises:

a housing having a shape mountable interchangeably with an ordinary cassette tape reproduced in a cassette tape reproduction apparatus;

a magnetic head for outputting a signal, which transmits signals to a cassette tape reproduction head of the cassette tape reproduction apparatus;

a head holder, which is held swingably at substantially the center of a reproduction head insertion opening of the housing, and which accommodates the magnetic head; and a dummy tape frame, which is fixed to the head holder, and which has a pair of dummy tape members disposed on the right and left sides of a front surface of the magnetic head so as to maintain a predetermined positional relationship with head cores of the magnetic head; wherein a tape guide of the cassette tape reproduction apparatus and the dummy tape members engage with each other when the cassette adaptor is inserted into the cassette tape reproduction apparatus, and the magnetic head moves to a position in opposed relationship with the reproduction head of the cassette tape reproduction apparatus.

The cassette adaptor of the present invention is capable of aligning the positions of the magnetic head and the dummy tape members during assembly.

While the novel features of the present invention are set forth particularly in the appended claims, the present invention, both as to organization and content, will be better understood and appreciated, along with other objects and features thereof, from the following detailed description taken in conjunction with the drawings.

It will be recognized that some or all of the Figures are schematic representations for purposes of illustration and do not necessarily depict the actual relative sizes or locations of the elements shown.

DETAILED DESCRIPTION OF THE INVENTION

Preferred embodiments of a cassette adaptor according to the present invention will be described below with reference to the accompanying drawings.

<<First Embodiment>>

Figure 1:
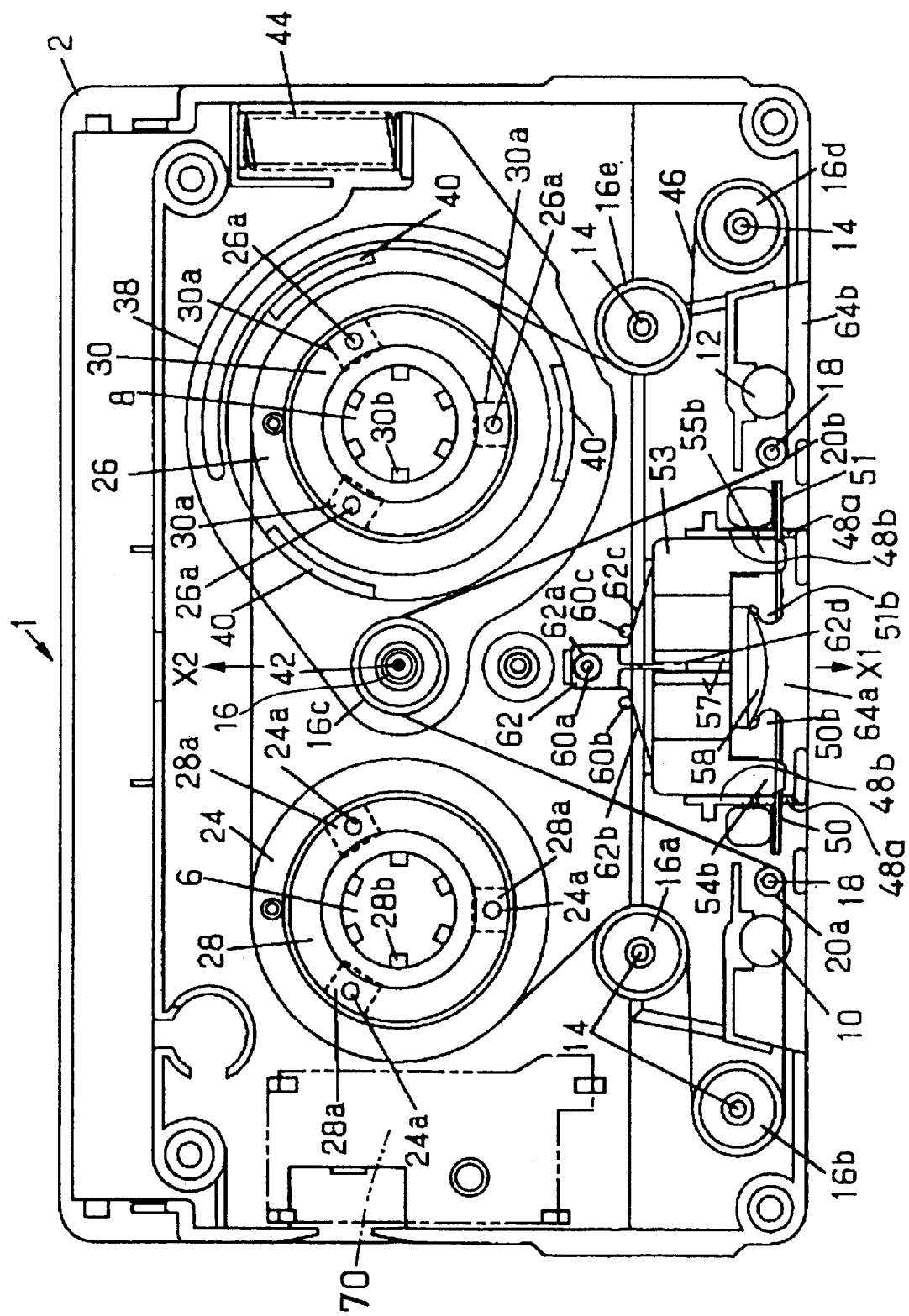
FIG. 1 is a plan view showing an internal structure of a back case of a cassette adaptor according to a first embodiment of the present invention with a front case removed.
Figure 2:
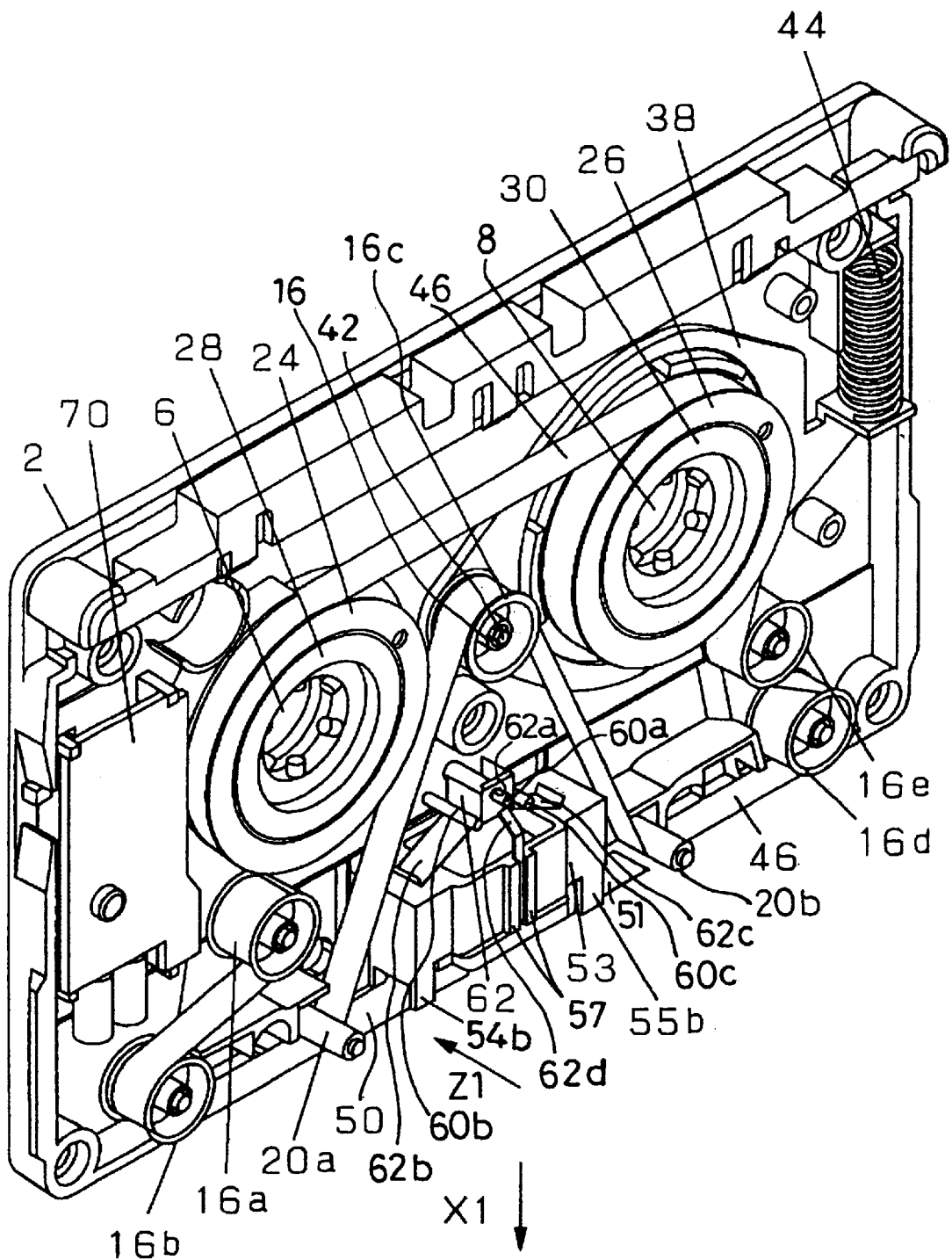
FIG. 2 is a perspective view showing an internal structure of the cassette adaptor according to the first embodiment.
Figure 3:
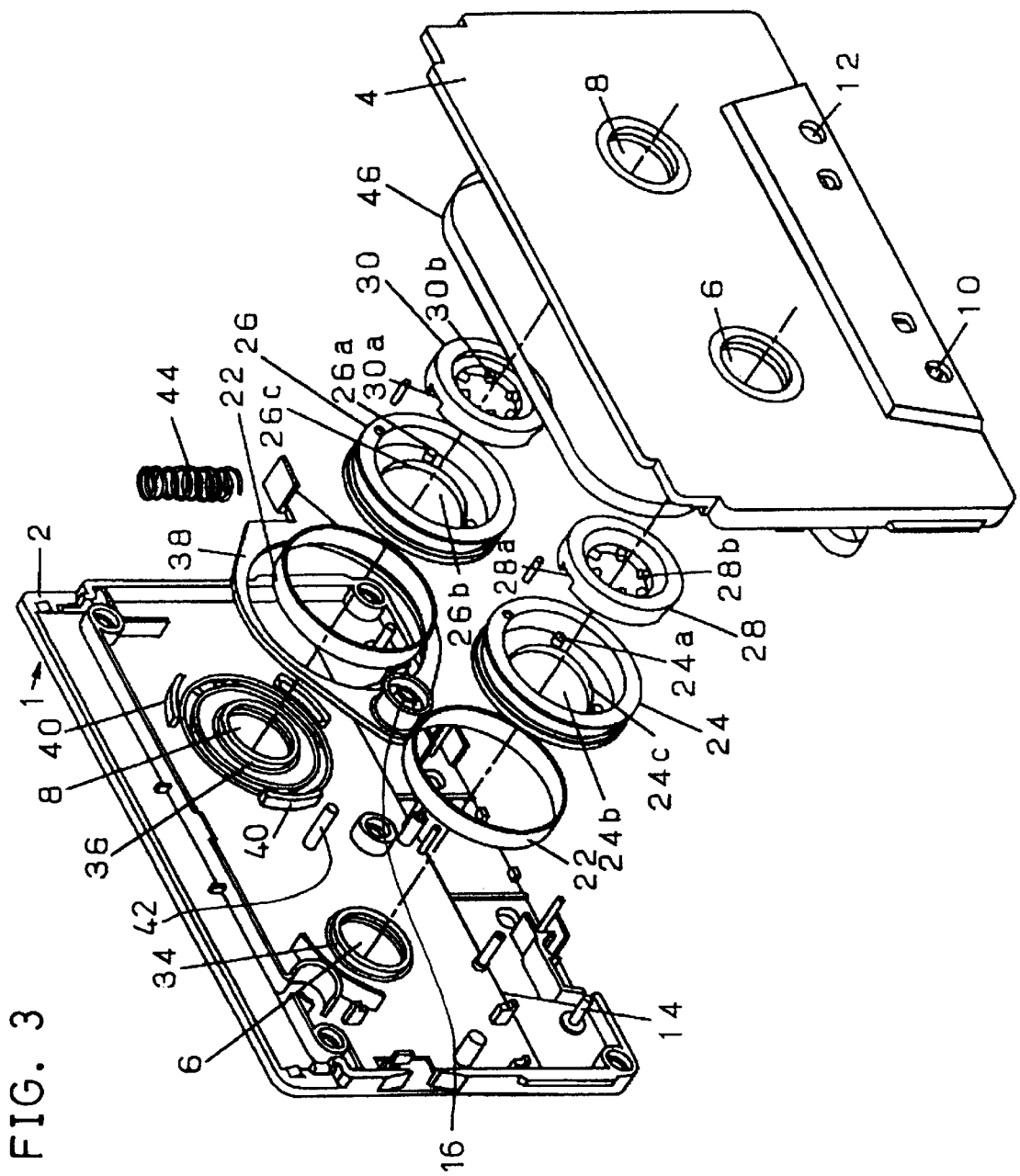
FIG. 3 is an exploded perspective view showing constituent parts of the cassette adaptor according to the first embodiment.

FIG. 1 is a plan view showing an internal structure inside of a back case 2 of a cassette adaptor 1 with a front case 4 removed, according to a first embodiment of the present invention. FIG. 2 is a perspective view showing the internal structure inside of the back case 2 of the cassette adaptor 1 under the condition of FIG. 1. FIG. 3 is an exploded perspective view showing constituent parts of the cassette adaptor 1 according to the first embodiment. In the description of the first embodiment that follows, a compact cassette tape will be taken as an example of the cassette tape.

[Internal Structure of Cassette Adaptor]

A housing of the cassette adaptor 1 of the first embodiment is formed by coupling the back case 2 and the front case 4 to each other. The cassette adaptor 1 has constituent parts accommodated in the housings. The back case 2 and the front case 4 each have two holes 6, 8 for reel shafts and holes 10, 12 for inserting capstans formed similarly therein at the right and left.

As shown in FIG. 1, the housing has four pins 14 erected thereon for pivotally supporting four tape rollers 16a, 16b, 16d, 16e, respectively. The housing also has two pins 18 erected thereon for pivotally supporting two tape rollers 20a, 20b, respectively.

As shown in FIGS. 2 and 3, two hollow reels 24, 26 disposed at the right and left positions in the housing have anti-slide reel rubber pieces 22 formed of chloroprene rubber, silicon rubber or the like mounted on the periphery thereof. The reels 24, 26 each have three protrusions 24a, 26a formed inside thereof to protrude in parallel to the reel axis, so that the protrusions 24a, 26a engage with reel hubs 28, 30 to be mounted inside the reels 24, 26.

There are small clearances between outer peripheral surfaces of the reel hubs 28, 30 to be mounted inside the reels 24, 26 and inner surfaces of the reels 24, 26. Three notches 28a, 30a are formed in the outer peripheral surfaces of the reel hubs 28, 30 at positions corresponding to the protrusions 24a, 26a to be inserted.

In order to transmit the driving force smoothly to the reels 24, 26 from the reel shafts (not shown) of the cassette tape reproduction apparatus wherein the cassette adaptor 1 is to be inserted, six protrusions 28b, 30b are formed on the inner peripheral surfaces of the reel hubs 28, 30 to be mounted in the inner spaces 24b, 26b of the reels 24, 26. The protrusions 28b, 30b formed on the inner peripheral surfaces of the reel hubs 28, 30 have s slight play in the direction of the rotation axes and in the radial direction of the reels 24, 26. Therefore, the driving force from the reel shafts of the cassette tape reproduction apparatus is transmitted smoothly to the reels 24, 26.

The reels 24, 26 with the reel hubs 28, 30 mounted thereon are rotatably supported by the engagement between the outer peripheral surfaces of ribs 34, 36 formed around the holes 6, 8 of the back case 2 and the inner peripheral surfaces of the reels 24, 26.

As shown in FIG. 3, a tension lever 38 disposed on the outer peripheral surface of the right reel 26 is rotatably supported by three ribs 40 formed on the back case 2. A roller 16c at the left end of the tension lever 38 is pivotally supported by a pin 42 erected between the reel shaft holes 6, 8 formed on the left and right of the back case 2. Disposed on the right side of the tension lever 38 is a tension spring 44 urging the tension lever 38 to rotate clockwise.

The housing configured as described above has an endless dummy tape 46 arranged therein to wind around the reels 24, 26 and the rollers 16a, 16b, 16c, 16d, 16e, 20a and 20b.

The dummy tape 46 is an endless tape formed in loop from polyethylene terephthalate or the like having a thickness of 40 to 80 micrometers. The dummy tape 46 has the same width as that of the magnetic tape of an ordinary compact cassette tape.

As shown in FIG. 2, the dummy tape 46 is arranged to wind around the left reel 24 counterclockwise, around the roller 16a clockwise, and then around the rollers 16b, 20a counterclockwise. Then the dummy tape 46 runs to wind around the roller 16c clockwise, around the rollers 20b, 16d counterclockwise, around the roller 16e clockwise and around the right reel 26 counterclockwise, then returns to the left reel 24.

The roller 16c at the left end of the tension lever 38 is pressed upward in the direction of arrow X2 in FIG. 1 by the force of the tension spring 44. As a result, a certain amount of tension is applied to the dummy tape 46 wound around the roller 16c.

As shown in FIG. 1, the dummy tape 46 is arranged to pass through the capstan insertion holes 10, 12 and pinch roller insertion openings 64b, 64c, similarly to the magnetic tape of an ordinary cassette tape. Consequently, when the cassette adaptor is mounted on the cassette tape reproduction apparatus, the dummy tape 46 is held between the capstan and the pinch roller of the cassette tape reproduction apparatus and is fed in the rightward direction (counterclockwise) in FIG. 1 at a substantially constant speed by the rotary driving force of the capstan.

Figure 4:
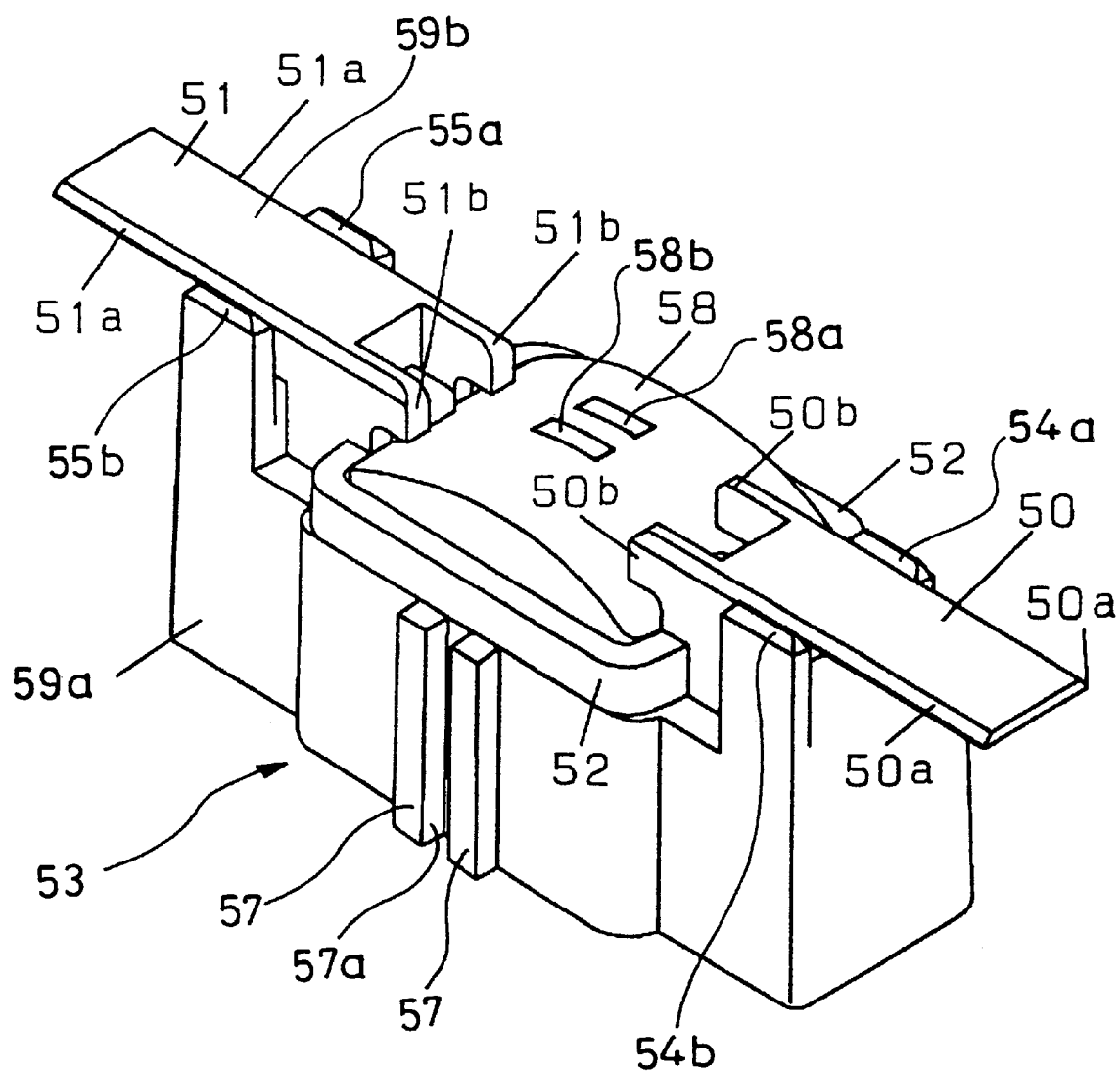
FIG. 4 is a perspective view showing a key portion around a head of the cassette adaptor according to the first embodiment.

FIG. 4 is a perspective view showing the configuration of a head cover unit 53 holding the magnetic head 58 of the cassette adaptor 1 according to the first embodiment. The head cover unit 53 is disposed on the front side (the lower side in FIG. 1) of the housing. The head cover unit 53 has dummy tape members 50, 51 having a fixed length formed on both ends thereof. Fixed inside the head cover unit 53 is the magnetic head 58 for signal output.

The head cover unit 53 configured as described above is held by the head spring 62 (FIG. 2) in the housing to be movable to a certain extent vertically and laterally. The back case 2 has three pins 60a, 60b, 60c erected thereon. The middle pin 60a penetrates through the hole 62a formed in the head spring 62 thereby to hold the head spring 62. The left and right pins 60b, 60c support the head spring 62 on the left side face and the right side thereof, respectively, thereby regulating the lateral movement of the head spring 62.

The head spring 62 has three spring pieces 62b, 62c, 62d. The three spring pieces 62b, 62c, 62d hold the head cover unit 53 to be capable of swinging. As shown in FIG. 2, tips of the two spring pieces 62b, 62c make contact with the back surface (the top surface in FIG. 1) of the head cover unit 53, thereby to press the head cover unit 53 forward (the direction of arrow X1 in FIG. 1). Thus the head cover unit 53 is urged toward the opening 64a on the front surface of the housing (the direction of arrow X1 in FIG. 1) by the two spring pieces 62b, 62c. There are two ribs 48 formed near both sides of the opening 64a in the front surfaces of the back case 2 and the front case 4 of the housing. The head cover unit 53 urged toward the opening 64a on the front surface of the housing (the direction of arrow X1 in FIG. 1) is prevented from coming out of the opening 64a by the dummy tape members 50, 51 thereof and a stopper 48a of the rib 48 being in contact with each other. Guides 48b of the ribs 48 are disposed with a clearance on both sides of the head cover unit 53. Lateral movement of the head cover unit 53 is regulated within a slight movement by the guides 48b provided on both sides thereof. Thus the head cover unit 53 is guided by the ribs 48 to be movable to a certain extent in the lateral and vertical directions.

The head cover unit 53 is also urged by the middle spring piece 62d in the direction of arrow Z1 in FIG. 2, and is pressed against the back case 2.

[Configuration of Head Cover Unit]

Figure 5:
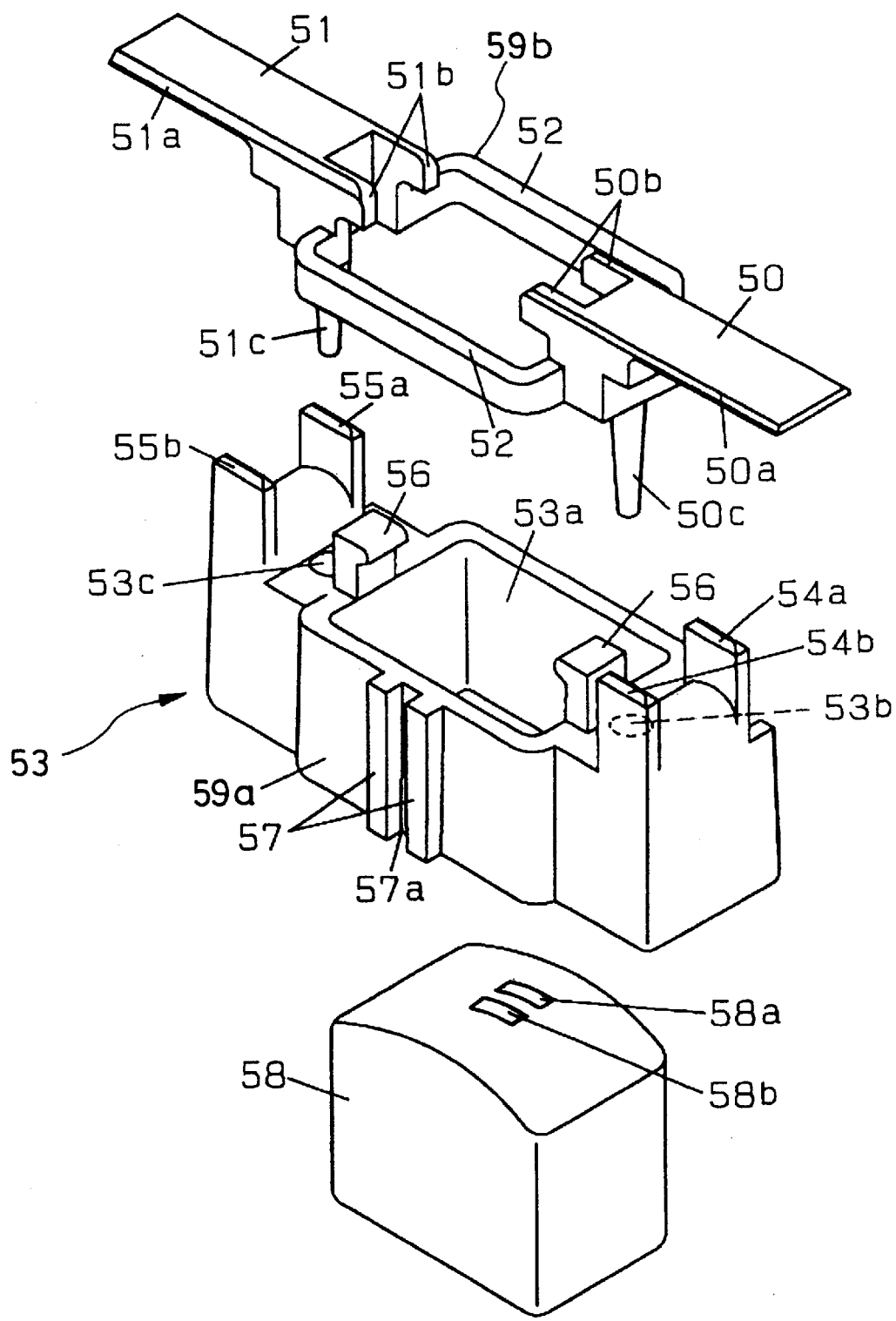
FIG. 5 is an exploded perspective view showing the portion around the head of the cassette adaptor according to the first embodiment.

The head cover unit 53 having the magnetic head 58 in the cassette adaptor of the first embodiment will now be described in detail below with reference to FIGS. 4 and 5. FIG. 5 is an exploded perspective view of the head cover unit 53 having the magnetic head 58 shown in FIG. 4.

As shown in FIGS. 4 and 5, the head cover unit 53 has the head holder 59a holding the magnetic head 58 and the dummy tape frame 59b disposed in front of the magnetic head 58. The dummy tape frame 59b has the dummy tape members 50, 51 formed in the left and right front positions of the magnetic head, linkage pieces 52, 52 linking the left and right dummy tape members 50, 51, and two pins 50c, 51c protruding downward, integrally formed thereon. The dummy tape members 50, 51 formed to protrude to the left and right sides have widths within tolerable dimensions of magnetic tape standard for the ordinary cassette tapes used in the cassette tape reproduction apparatus. Therefore, when the cassette adaptor is mounted in the cassette tape reproduction apparatus, the dummy tape members 50, 51 are securely held onto the tape guide of the reproduction head. Also the dummy tape members 50, 51 have tapered portions 50a, 51a formed on the upper and lower end faces thereof. Thus the dummy tape members 50, 51 have such a shape that can be easily inserted onto the tape guide of the cassette tape reproduction apparatus.

As shown in FIG. 5, in the head cover unit 53 according to the first embodiment, there are ribs 50b, 51b formed on the front face side of the dummy tape frame 59b. Corners between the front surface and the opposing surface are rounded into curved surfaces on both ribs 50b, 51b. As the corners between the front surface of the both ribs 50b, 51b and the opposing surface are rounded into curved surfaces, when the cassette adaptor 1 is mounted on the cassette adaptor reproduction apparatus, the reproduction head of the cassette tape reproduction apparatus makes contact with the ribs 50b, 51b, and the center of the reproduction head and the center of the magnetic head 58 are aligned. Thus the ribs 50b, 51b on both sides of the dummy tape frame 59b function as guide for the reproduction head, and they are provided for reducing magnetic gap between the reproduction head and the magnetic head 58.

The head cover unit 53 has two head spring guides 57 formed in the side face thereof for forming a groove 57a. Engaged with the head spring guides 57 is a spring piece 62d of the head spring 62, and the head spring 62 presses the head cover unit 53 in a condition capable of swinging.

The magnetic head 58 of the cassette adaptor 1 according to the first embodiment has the same track configuration as that of the reproduction head of the cassette tape reproduction apparatus wherein the cassette adaptor 1 is mounted.

Now a method of assembling the magnetic head 58 in the head cover unit 53 will be described below. In FIG. 5, a hollow 53a of the head holder 59a of the head cover unit 53 can accommodate the magnetic head 58 and is made slightly larger than the magnetic head 58 in the direction of width of the magnetic tape. The magnetic head 58 is inserted into the hollow 53a from the back side (the lower side in FIG. 5). The magnetic head 58 inserted into the hollow 53a makes contact with the inner sides of two ribs 56 which determines the position of the magnetic head 58 in the longitudinal direction.

As shown in FIG. 5, the head holder 59a has two sets of dummy tape guides 54a, 54b, 55a, 55b formed thereon. The dummy tape guides 54a, 54b, 55a, 55b are configured to interpose the dummy tape members 50, 51 of the dummy tape frame 59b between thereof. The magnetic head 58 inserted into the head holder 59a, as described above, accurately determines the positions of the cores 58a, 58b of the magnetic head 58 on the assumption that the magnetic tape runs between the dummy tape guides 54a, 54b, 55a, 55b. After the magnetic head 58 is positioned, an adhesive is injected into the gap between the magnetic head 58 and the walls of the hollow 53a, thereby to fasten the magnetic head 58. For this purpose, such a known bonding technology can be employed as, for example, the magnetic head 58 and the head holder 59a are partially fastened by using an instantaneous adhesive, and then a 2-component type adhesive is poured into the remaining gap to fasten the two parts over a longer period of time.

Two pins 50c, 51c of the dummy tape frame 59b are inserted into two holes 53c, 53c formed in the head holder 59a, respectively, so that the dummy tape frame 59b is mounted on the head holder 59a whereon the magnetic head 58 is bonded. At this time, the dummy tape members 50, 51 are inserted between dummy tape guides 54a, 54b, 55a, 55b provided at both sides of the magnetic head 58 and disposed at these positions. In case the dummy tape members 50, 51 are smaller in width than the distance between opposing surfaces of the dummy tape guides 54a, 54b, 55a, 55b and there are gaps between the dummy tape members 50, 51 and the dummy tape guides 54a, 54b, 55a, 55b, then the dummy tape members 50, 51 are brought into contact with the inner surfaces of the dummy tape guides 54a, 55a which are on the back side and serve as the reference surface among the dummy tape guides 54a, 54b, 55a, 55b while fastening. For this reason, the holes 53c, 53c formed in the head holder 59a in the first embodiment are made somewhat larger than the pins 50c, 51c of the dummy tape frame 59b.

When assembled as described above, the dummy tape guides 54a, 54b, 55a, 55b are designed to be positioned outside the right and left ends of the opening for inserting the recording/reproduction head of an ordinary cassette tape housing. The dummy tape guides 54a, 54b, 55a, 55b are also designed to be positioned nearer to the magnetic head 58 than to the opening for inserting the pinch roller of an ordinary cassette tape housing. Further, the dummy tape members 50, 51 in the first embodiment are also designed to be positioned nearer to the magnetic head 58 than to the opening for inserting the pinch roller of an ordinary cassette tape housing.

With the cassette adaptor 1 according to the first embodiment configured as described above, when the cassette adaptor 1 is inserted into the cassette tape reproduction apparatus, the reproduction head and the pinch roller of the cassette tape reproduction apparatus do not make contact with the dummy tape guides 54a, 54b, 55a, 55b, and the pinch roller does not make contact with the dummy tape members 50, 51.

In the cassette adaptor of the first embodiment, the magnetic head 58 may be covered on the front face thereof by a protective sheet in order to prevent surface impairment of the magnetic head 58 and the reproduction head of the cassette tape reproduction apparatus when brought into contact with each other.

The head cover unit 53 assembled as described above is, when mounted on the back case 2 shown in FIG. 1, arranged so that the head spring guide 57 is disposed in the foreground. The cassette adaptor 1 of the first embodiment is assembled with the internal parts thereof being held between the back case 2 and the front case 4 and fastened with screws or the like not shown. The cassette adaptor 1 thus assembled is disposed so that the dummy tape members 50, 51 of the head cover unit 53 are placed at positions where the magnetic tape of the ordinary cassette tape runs.

An electrical circuit board 70 provided in the cassette adaptor shown in FIGS. 1 and 2 has an audio circuit for feeding input signals from external equipment such as a compact disc reproduction apparatus to the magnetic head 58. Connected to the electrical circuit board 70 is a cable (not shown) terminated with a plug similarly to the case of the prior art.

The plug at the end of the cable from the cassette adaptor 1 is connected to an output terminal (for example, headphone terminal) of equipment that supplies input signals to the cassette adaptor 1, that is a portable compact disc reproduction apparatus in the case of the first embodiment. Signals from the compact disc reproduction apparatus are input to the audio circuit and is output to the magnetic head 58.

[Operation of Cassette Adaptor]

Now the operation of the cassette adaptor 1 configured as described above according to the first embodiment will be described below. The description of the operation that follows assumes that the cassette adaptor 1 of the first embodiment, instead of a cassette tape, is mounted in the cassette tape reproduction apparatus having a reproduction head.

When the cassette adaptor 1 of the first embodiment is mounted in the cassette tape reproduction apparatus not shown, reel shafts (not shown) of the cassette tape reproduction apparatus are inserted into the reel shaft holes 6, 8 of the housing which is constituted from the back case 2 and the front case 4. The reel shafts engage with the six protrusions 28b, 30b formed on the inner peripheral surfaces of the reel hubs 28, 30, thereby to drive the reel hubs 28, 30 to rotate. Simultaneously with this operation of driving the rotation, the capstan (not shown) of the cassette tape reproduction apparatus inserted in the capstan insertion hole 12 of the housing makes contact with the pinch roller (not shown), which is inserted through the opening 64b on the front face of the housing. At the same time, a dummy tape 46 is sandwiched between the capstan and the pinch roller. The dummy tape 46 is held between the capstan and the pinch roller of the cassette tape reproduction apparatus and is fed out to the right (counterclockwise) in FIG. 1 by the rotation of the capstan. This movement of the dummy tape 46 causes the two reels 24, 26 on the left and right in the housing to rotate. The dummy tape 46 is in contact with the anti-slip reel rubber piece 22 provided on the outer peripheral surface of the reels 24, 26, and therefore the two reels 24, 26 on the left and right rotate without slipping.

The three protrusions 24a, 26a formed inside the reels 24, 26 are engaged with the three notches 28a, 30a of the reel hubs 28, 30, and therefore the reel hubs 28, 30 rotate reliably upon rotation of the reels 24, 26.

Because the dummy tape 46 is wound around the reels 24, 26 and the driving force of the dummy tape 46 acts on the reel hubs 28, 30, the reel shafts of the cassette tape reproduction apparatus are prevented from rotating at a high speed without load. Consequently, when the cassette adaptor 1 of the first embodiment is mounted in a cassette tape reproduction apparatus equipped with a sensor for sensing a trouble in the reel shaft rotation, the cassette tape driving mechanism is prevented from automatically stopping.

In the cassette adaptor 1 mounted in the cassette tape reproduction apparatus, signals are input to the audio circuit of the electrical circuit board 70 via the plug and the cable connected to the output terminal (headphone terminal) of the compact disc reproduction apparatus. The signals input to the audio circuit are converted into a desirable form and is input to the magnetic head 58.

Figure 6:
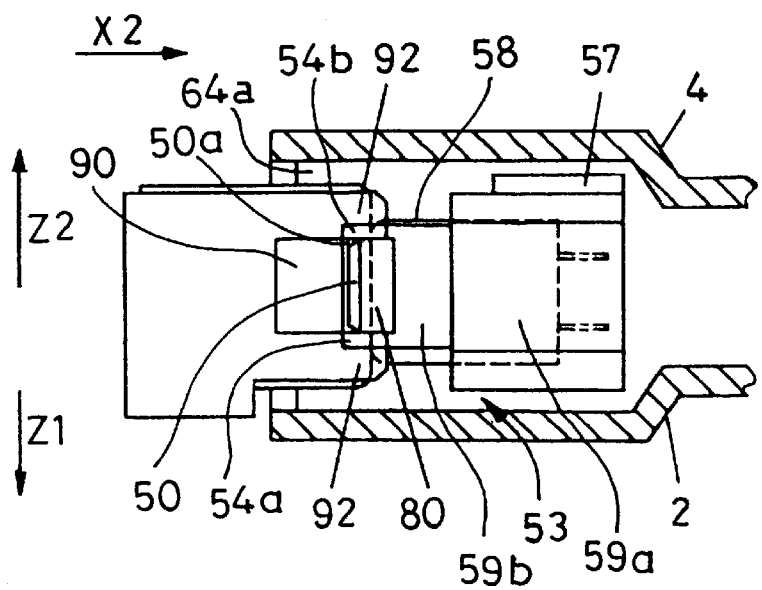
FIG. 6 is a sectional side view (a) and a sectional plan view (b) showing the magnetic head of the cassette adaptor and the reproduction head of the cassette tape reproduction apparatus of the first embodiment in engaged state.
Figure 6:
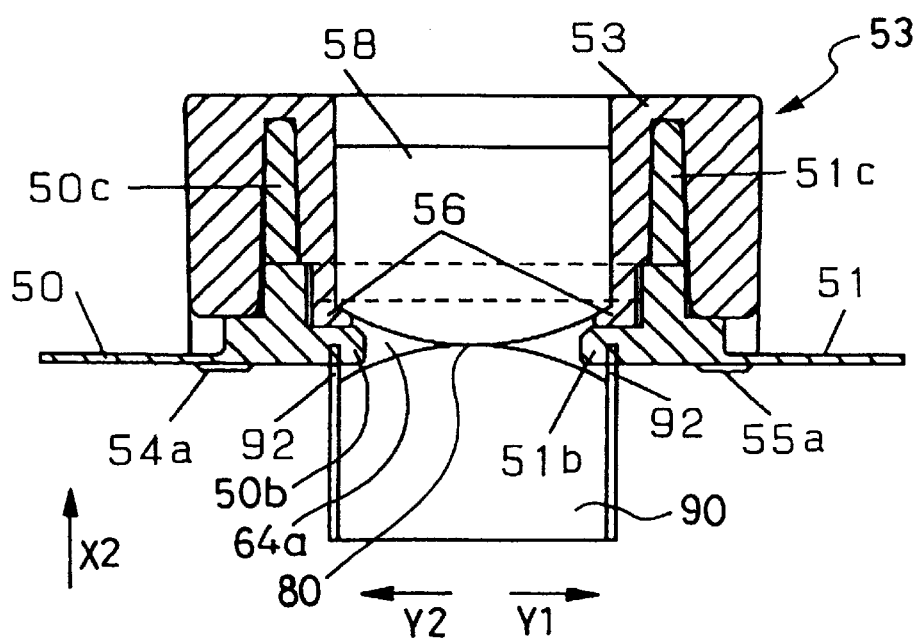

Under the condition that the cassette adaptor 1 is mounted in the cassette tape reproduction apparatus, operation of playing the cassette tape reproduction apparatus will be described below with reference to FIG. 6. FIG. 6 is a drawing for explaining the magnetic head 58 and the reproduction head 90 of the cassette tape reproduction apparatus in a state of being engaged with each other. (a) of FIG. 6 is a sectional side view showing the reproduction head 90 of the cassette tape reproduction apparatus inserted in the opening 64a of the cassette adaptor 1. As shown in (a) of FIG. 6, when the cassette tape reproduction apparatus is operated for reproduction, the reproduction head 90 moves forward in the direction of arrow X2 in the opening 64a of the cassette adaptor 1. This forward movement is an essential movement of the reproduction head 90 of the cassette tape reproduction apparatus that is carried out with respect to a cassette tape inserted therein, for making contact with the magnetic tape.

In the forward movement (the movement in the direction of arrow X2 in (a) of FIG. 6) of the reproduction head 90, tapered portions 50a, 51a of the dummy tape members 50, 51 engage with the tape guide 92 of the cassette tape reproduction apparatus, and the dummy tape members 50, 51 are guided by the tapered portions 50a, 51a. In case the positions of the magnetic head 58 and the reproduction head 90 are not aligned in the width(vertical) direction of the tape, the dummy tape members 50, 51 move while being guided by the tape guide 92, an the magnetic head 58 is positioned in alignment with the reproduction head 90 in the direction of tape width. In case the tape guide 92 is displaced slightly above the dummy tape members 50, 51 (direction of arrow Z2 in (a) of FIG. 6), for example, the tape guide 92 makes contact with the lower tapered portions 50a, 51a of the dummy tape members 50, 51 and the dummy tape members 50, 51 move upward. With this upward movement of the dummy tape members 50, 51, the magnetic head 58 moves upward (the direction of arrow Z2 in (a) of FIG. 6). As a result, the head cores 58a, 58b (FIG. 4 and FIG. 5) of the magnetic head 58 are disposed to oppose the head core position of the reproduction head 90.

When the head cover unit 53 having the magnetic 2head 58 moves to a desired position, as described above, top surface of the head cover unit 53 is urged by the spring piece 62d of the head spring 62 in the direction of arrow Z1 to press against the back case 2 (refer to FIG. 2). In the movement of the head cover 54, when the dummy tape members 50, 51 are smaller than the tape guide 92 in width, the head cover unit 53 is always pressed against the inner surface of the tape guide on the back side, that is the reference surface side of the tape guide 92, by the spring piece 62d of the head spring 62, and therefore the magnetic head 58 is maintained at the correct head position with respect to the reproduction head 90.

(b) of FIG. 6 is a sectional plan view showing the magnetic head 58 and the reproduction head 90 in contact with each other. In (b) of FIG. 6, in case that the centers of the reproduction head 90 and the magnetic head 58 are not aligned in the tape running direction (the direction of arrow Y1 or Y2 in (b) of FIG. 6), the reproduction head 90 moving forward in the direction of arrow X2 first makes contact with either the rib 50b or 51b. In case that the reproduction head 90 is displaced in the direction of arrow Y2 with respect to the magnetic head 58, for example, the reproduction head 90 moving in the direction of arrow X2 makes contact with the rib 50b. When the reproduction head 90 makes contact with the rib 50b, the rib 50b receives a force to move along the curved front surface of the reproduction head 90. Consequently, the head cover unit 53 holding the magnetic head 58 moves along with the rib 50b in the direction of arrow Y2. As a result, the magnetic head 58 and the reproduction head 90 are disposed at positions where the centers thereof are aligned in the tape running direction.

As described above, when the cassette adaptor 1 of the first embodiment is mounted in the cassette tape reproduction apparatus, the signal to be transmitted from the magnetic head 58 is input to the reproduction head 90 of the cassette tape reproduction apparatus with a high efficiency in the form of leaking magnetic field, and therefore the magnetic head 58 is automatically aligned with the reproduction head 90. At this time, the dummy tape members 50, 51 provided on the front surface of the head cover unit 53, which holds the magnetic head 58, are inserted into the tape guide 92 of the reproduction head 90, and the magnetic head 58 is disposed at a position opposing the reproduction head 90.

According to the first embodiment, the head holder 59a which holds the magnetic head 58 has the dummy tape guides 54a, 54b, 55a, 55b, which have predetermined dimensional relationship with the positions of the head cores 58a, 58b. The head holder 59a is configured so that the dummy tape members 50, 51 of the dummy tape frame 59b fit into the dummy tape guides 54a, 54b, 55a, 55b. Consequently, the dummy tape members 50, 51 are disposed at desired positions with high accuracy with respect to the magnetic head 58.

As described above, when the signal from the magnetic head 58 of the cassette adaptor 1 is input to the reproduction head of the cassette tape reproduction apparatus, the dummy tape members 50, 51 are configured to be surely inserted into the tape guide 92 of the reproduction head 90, and consequently, the magnetic head 58 is surely disposed at the desired position in the direction of tape width with respect to the reproduction head 90.

Since the ribs 50b, 51b are provided on the front surface of the head cover unit 53 in the cassette adaptor 1 according to the first embodiment, the head cover unit 53 is disposed at a desired position with respect to the reproduction head 90 when the cassette adaptor 1 is mounted in the cassette tape reproduction apparatus. And the magnetic head 58 is guided to a correct position in the tape running direction with respect to the reproduction head 90.

As described above, when the cassette adaptor 1 of the first embodiment is mounted in the cassette tape reproduction apparatus, the magnetic head 58 and the reproduction head 90 are aligned with each other without positional disparity in both the tape width direction and the tape running direction, and are disposed at the desired positions where the gap between the head cores of both heads is minimum.

In the cassette adaptor 1 of the first embodiment, since the head cover unit 53 having the magnetic head 58 is urged by the spring piece 62d of the head spring 62 in the direction of pressing against the back case 2, the magnetic head 58 can be positioned accurately with respect to the reproduction head 90, even when there is a gap between the tape guide 92 of the reproduction head 90 and the dummy tape members 50, 51. This is achieved by utilizing the fact that, when an ordinary cassette tape is inserted into the cassette tape reproduction apparatus, the reproduction head is positioned by taking reference to the lower end of the magnetic tape of the cassette tape in the direction of width thereof.

<<Second Embodiment>>

Figure 7:
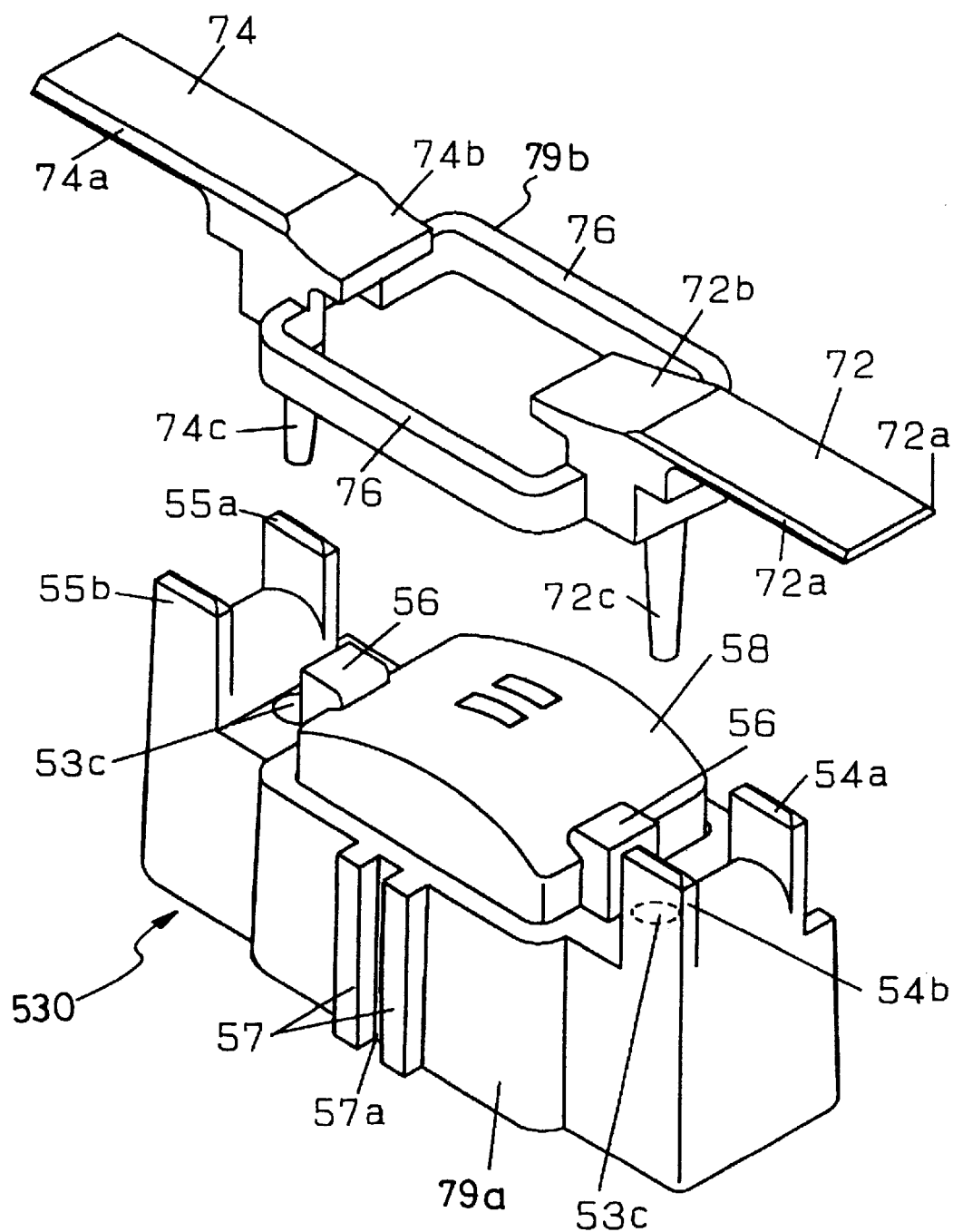
FIG. 7 is an exploded perspective view showing a key portion around a head of a cassette adaptor according to a second embodiment of the present invention.

Now a second embodiment of the cassette adaptor of the present invention will be described below with reference to the accompanying drawings. FIG. 7 is an exploded perspective view of a head cover unit 530 of the cassette adaptor according to the second embodiment of the present invention. The cassette adaptor of the second embodiment has substantially the same configuration as that of the cassette adaptor 1 of the first embodiment, except for the head cover unit 530 to be described later. In FIG. 7, components having the same functions and configurations are assigned with the same numerals as those in the first embodiment. Portions different from the first embodiment will be described below.

As shown in FIG. 7, the head cover unit 530 of the second embodiment has a head holder 79a for holding the magnetic head 58 and a dummy tape frame 79b to be bonded onto the head holder 79a, similarly to the head cover unit 53 of the first embodiment. Details of the magnetic head 58 and the head holder 79a are the same as those shown in FIG. 5 and are assembled similarly.

The dummy tape frame 79b of the second embodiment has dummy tape members 72, 74 formed on both sides thereof and two linkage pieces 76 which link the dummy tape members 72, 74, being formed integrally. As shown in FIG. 7, configuration of the dummy tape members 72, 74 at the end on the magnetic head side is different from that in the first embodiment, in that head guides 72b, 74b are formed at the end of the dummy tape members 72, 74 on the magnetic head side. The head guides 72b, 74b of the dummy tape frame 79b in the second embodiment are provided instead of the ribs 50b, 51b of the first embodiment, and have a concave shape of a radius of curvature slightly larger than the radius of curvature of the front surface of the reproduction head 90.

The head cover unit 530 having the head holder 79a and the dummy tape frame 79b configured as described above is assembled as described below.

First, similarly to the first embodiment, the magnetic head 58 is inserted into the head holder 79a so that the magnetic head 58 makes contact with the rib 56 and the position of the magnetic head 58 in the longitudinal direction is determined.

Then two pins 72c, 74c formed on the dummy tape frame 79b are, with an adhesive applied thereto, inserted in the holes 53c, 53c of the head holder 79a. The dummy tape members 72, 74 are inserted between two sets of dummy tape guides 54a, 54b, 55a, 55b. In case there are gaps between the dummy tape members 72, 74 and the dummy tape guides 54a, 54b, 55a, 55b, inner surfaces of the lower (back case side) dummy tape guides 54a, 55a are used as reference surfaces. That is, the dummy tape frame 79b and the head holder 79a are fastened while urging the dummy tape frame 79b, so that the dummy tape members 72, 74 make contact with the reference surfaces of the two dummy tape guides 54a, 55a. The head cores 58a, 58b of the magnetic head 58 are disposed to oppose each other at a predetermined distance on an extended line connecting the dummy tape members 72, 74.

With the head cover unit 530 of the second embodiment assembled as described above, the dummy tape guides 54a, 54b, 55a, 55b are disposed on the outside in the lateral direction from the ends of the recording/reproduction head insertion opening of an ordinary cassette tape housing. The dummy tape guides 54a, 54b, 55a, 55b are also disposed nearer to the magnetic head 58 side than the inside end of the pinch roller insertion opening of the ordinary cassette tape housing.

The dummy tape members 72, 74 are disposed nearer to the magnetic head 58 side than the inside end of the pinch roller insertion opening of the ordinary cassette tape housing, similarly to the dummy tape guides 54a, 54b, 55a, 55b. This is for the purpose of preventing the reproduction head and the pinch roller of the cassette tape reproduction apparatus from making contact with the dummy tape guides 54a, 54b, 55a, 55b or the dummy tape members 72, 74 when the cassette adaptor 1 of the second embodiment is inserted in the cassette tape reproduction apparatus.

The magnetic head 58 may be covered on the front face thereof by a protective sheet as required. This is to prevent surface impairment of the magnetic head 58 and the reproduction head when brought into contact with each other.

The head cover unit 530 assembled as described above is mounted on the back case so that the head spring guide 57 is disposed to the front case. The cassette adaptor of the second embodiment is assembled with the internal parts thereof being held between the back case and the front case and fastened with screws or the like not shown. The cassette adaptor thus assembled is disposed so that the dummy tape members 72, 74 of the head cover unit 530 are placed at positions where the magnetic tape of the ordinary cassette tape runs.

As shown in FIG. 7, the dummy tape members 72, 74 have tapered portions 72a, 74a formed thereon similarly to the first embodiment, so that the dummy tape members 72, 74 can be easily inserted into the tape guide 92 of the reproduction head 90.

The head cover unit 530 of the second embodiment assembled as described above has the magnetic head 58 and the dummy tape members 72, 74, and can be used instead of the head cover unit 53 shown in FIGS. 1 and 2, while being mounted in the housing similarly. The spring piece 62d of the head spring 62 shown in FIGS. 1 and 2 are inserted in the groove 57a of the head spring guides 57, so that the head cover unit 530 is urged in the direction of pressing against the back case 2 (the direction of arrow Z1 in FIG. 2).

Operation of adjusting the position when the cassette adaptor of the second embodiment is inserted into the cassette tape reproduction apparatus is similar to that described for the first embodiment with reference to FIG. 6. For the position adjustment in the direction of tape width described with reference to (a) of FIG. 6, the dummy tape members 72, 74 are guided by tape guide of the cassette tape reproduction apparatus to move, so that the magnetic head 58 is disposed at a position aligned with the reproduction head in the direction of tape width.

Figure 8:
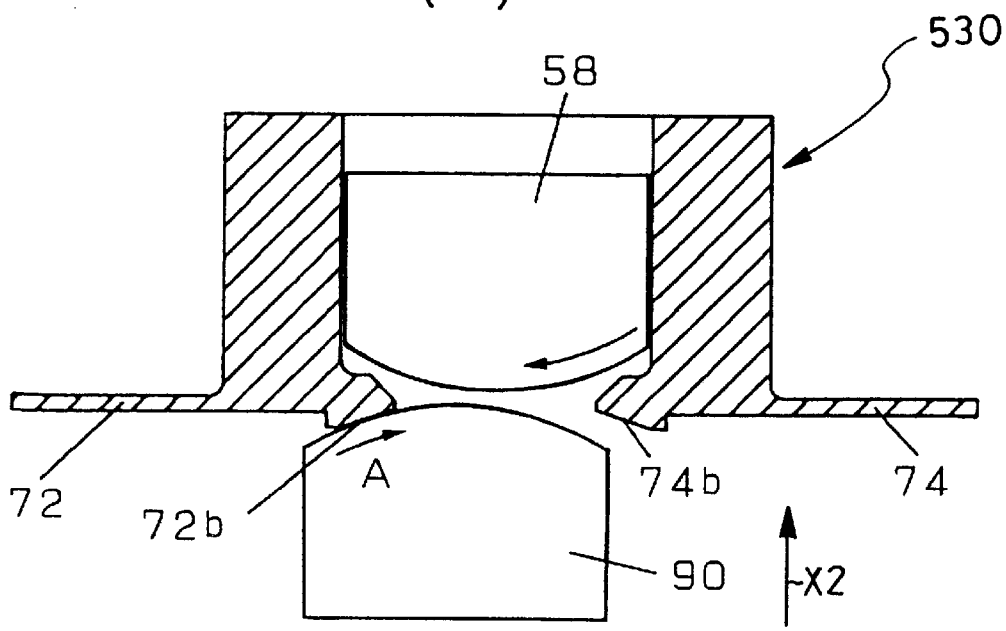
FIGS. 8(a–b) are drawings for explaining the engaged state of the magnetic head of the cassette adaptor and the reproduction head of the cassette tape reproduction apparatus of FIG. 7.
Figure 8:
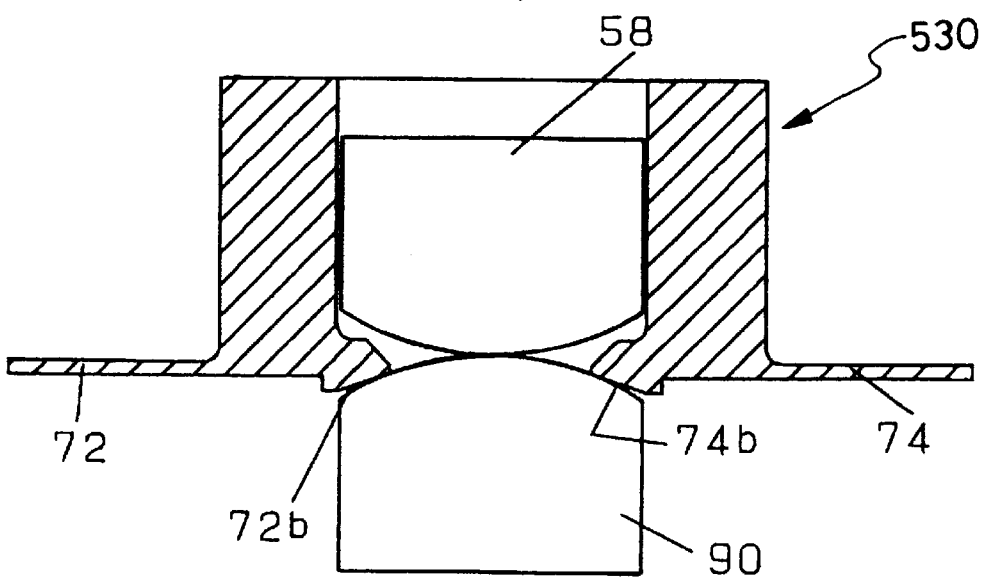

(a) of FIG. 8 is a sectional plan view showing the reproduction head 90 and the magnetic head 58 disposed with the centers thereof not aligned with each other in the tape running direction. As shown in (a) of FIG. 8, in case the centers of the reproduction head 90 and the magnetic head 58 are not aligned in the tape running direction, the reproduction head 90 moving forward in the direction of arrow X2 makes contact with one of the head guides 72b or 74b formed on the front surface of the head cover 54, for example the head guide 72b. When the reproduction head 90 makes contact with the head guide 72b, the head cover unit 530 receives a force to move along the curved front surface of the head guide 72b (the direction of arrow A in FIG. 8(a)) with respect to the reproduction head 90. Consequently, the head cover unit 530 holding the magnetic head 58 moves to a position where the magnetic head 58 and the reproduction head 90 are disposed so that the centers thereof are aligned in the tape running direction. FIG. 8(b) is a sectional plan view showing the magnetic head 58 and the reproduction head 90 with the centers thereof being aligned with each other in the tape running direction by the movement of the head cover unit 530.

In the operation of adjusting the position described above, the spring piece 62d of the head spring 62 engaged with the head cover unit 530 is small in the width, and is therefore capable of accommodate the movement in the tape running direction by deflecting.

As described above, the cassette adaptor of the second embodiment has the head guides 72b, 74b having a radius of curvature slightly larger than that of the front surface of the reproduction head 90, instead of the ribs 50b, 51b of the cassette adaptor of the first embodiment. Consequently, the cassette adaptor of the second embodiment is configured so that, when mounted in the cassette tape reproduction apparatus, head position of the magnetic head 58 in the tape width direction is automatically adjusted with respect to the reproduction head 90 and the centers of the magnetic head 58 and the reproduction head 90 in the tape running direction are automatically aligned.

<<Third Embodiment>>

Figure 9:
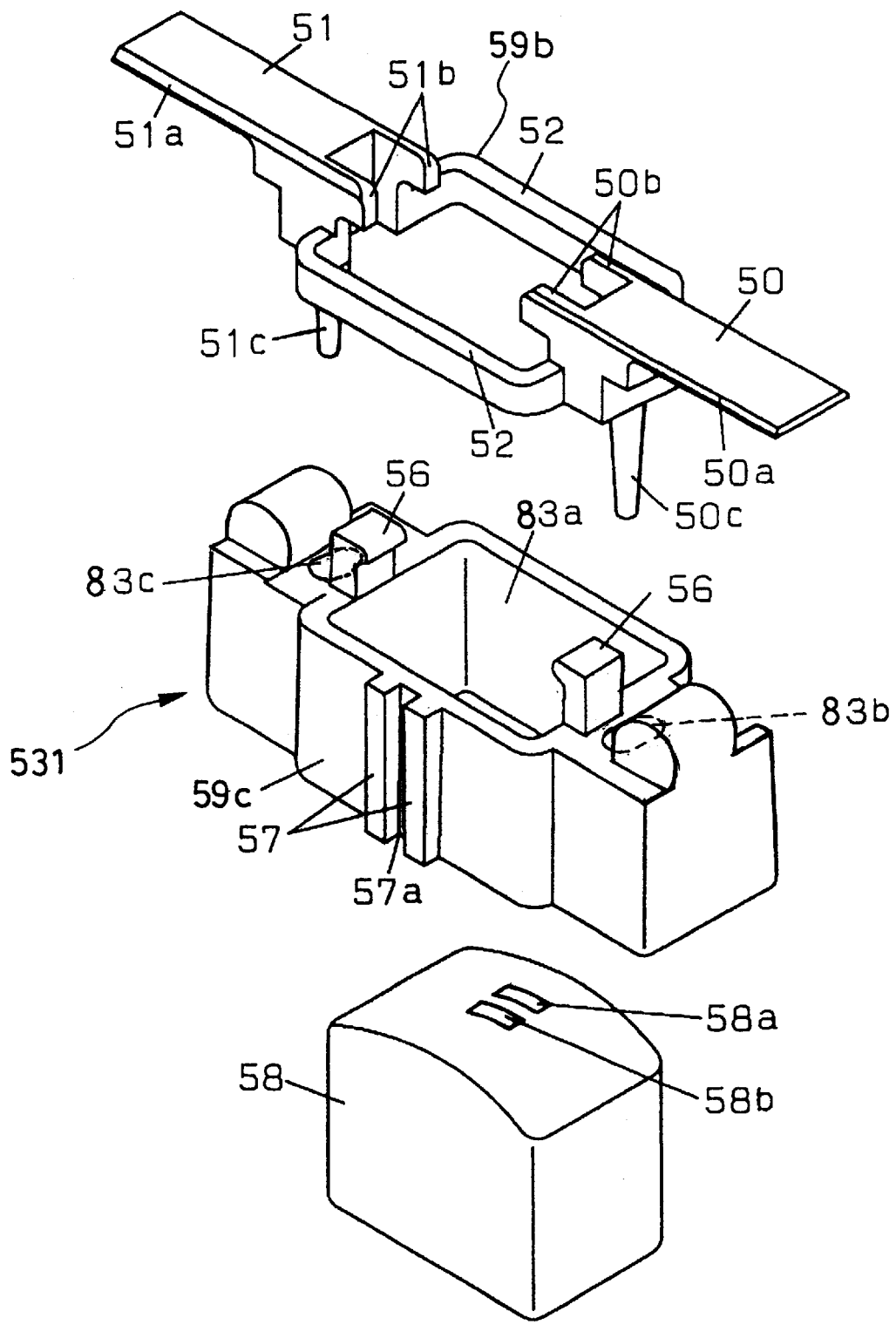
FIG. 9 is an exploded perspective view showing a key portion around a head of a cassette adaptor according to a third embodiment of the present invention.

Now a third embodiment of the cassette adaptor of the present invention will be described below with reference to FIG. 9. FIG. 9 is an exploded perspective view showing an example of a head cover unit 531 in the cassette adaptor according to the third embodiment. The cassette adaptor of the third embodiment is a variation of the cassette adaptors of the first embodiment and the second embodiment wherein a modification to be described later is applied. While FIG. 9 shows a variation of the first embodiment, a variation of the second embodiment can also be configured similarly. Constituent parts according to the third embodiment having the same functions and configurations as those in the other embodiments are assigned with the same numerals and description thereof will be omitted.

In the cassette adaptor of the third embodiment shown in FIG. 9, the dummy tape guides 54a, 54b, 55a, 55b of the cassette adaptor of the first embodiment are omitted. Two holes 83c formed in the head holder 59c of the head cover unit 531 are made a little wider in the tape width direction.

A hollow 83a of the head holder 59c in the third embodiment is formed in such a size as the magnetic head 58 just fits therein.

The head cover unit 531 of the cassette adaptor according to the third embodiment is assembled as described below.

First, similarly to the first embodiment, two pins 50c, 51c of the dummy tape frame 59c with an adhesive applied thereto are inserted into two holes 83b, 83c formed in the head cover unit 531. At this time, the dummy tape frame 59b is adjusted by moving in the tape width direction so that the dummy tape members 50, 51 of the dummy tape frame 59b are disposed at predetermined positions with respect to the head cores 58a, 58b of the magnetic head 58, and fastened at the adjusted position.

The head cover unit 531 assembled as described above is, when assembled in the cassette adaptor housing of the first embodiment or the second embodiment, capable of operating similarly to the other embodiments of the present invention.

The method of attaching the dummy tape frame 59b to the head cover 59c in the head cover unit 531 of the third embodiment is not limited to that described above, and melt-bonding or screw fastening may also be employed.

<<Fourth Embodiment>>

Figure 10:
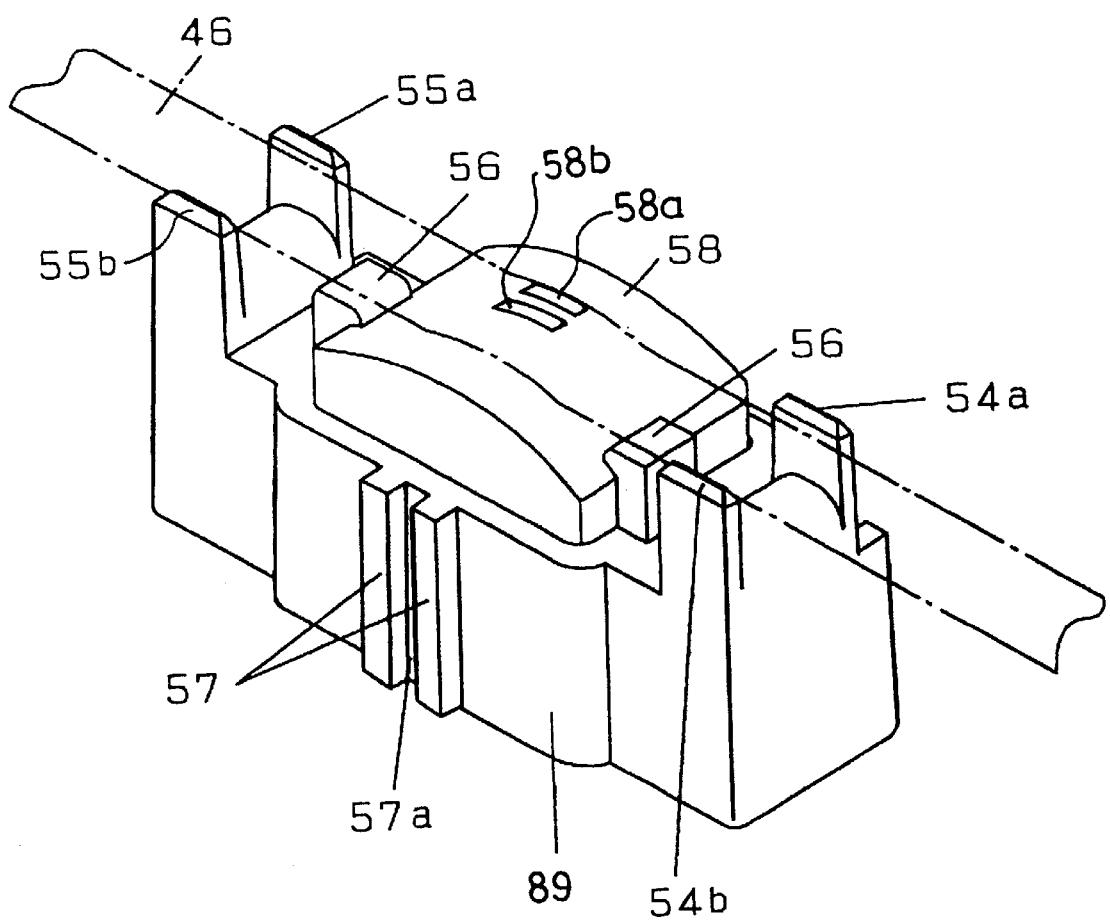
FIG. 10 is a perspective view showing a key portion around a head of a cassette adaptor according to a fourth embodiment of the present invention.
Figure 11:
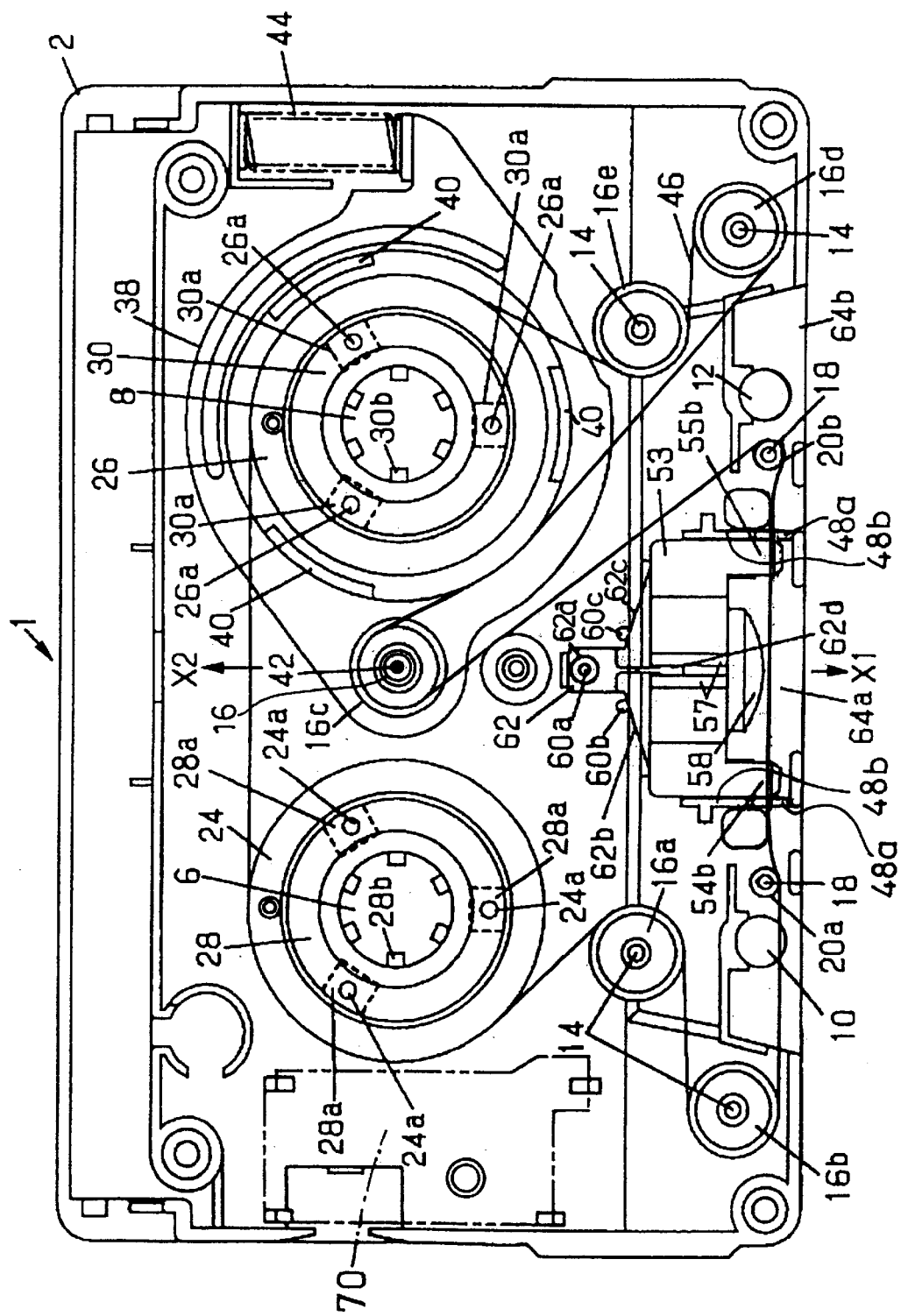
FIG. 11 is a plan view showing an internal structure of a back case of the cassette adaptor of the fourth embodiment with a front case being removed.
Figure 12:
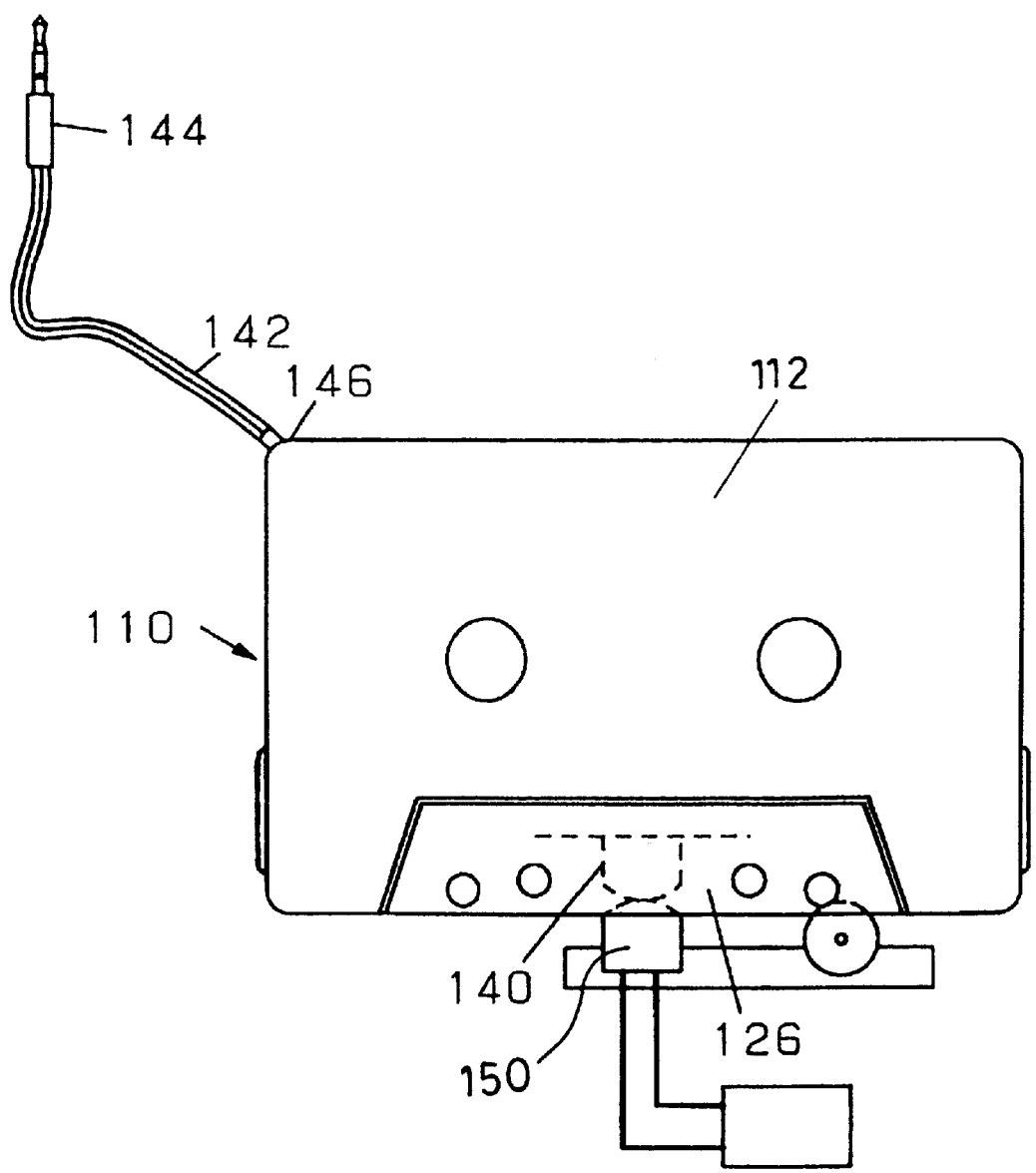
FIG. 12 is the plan view showing the conventional cassette adaptor.
Figure 13:
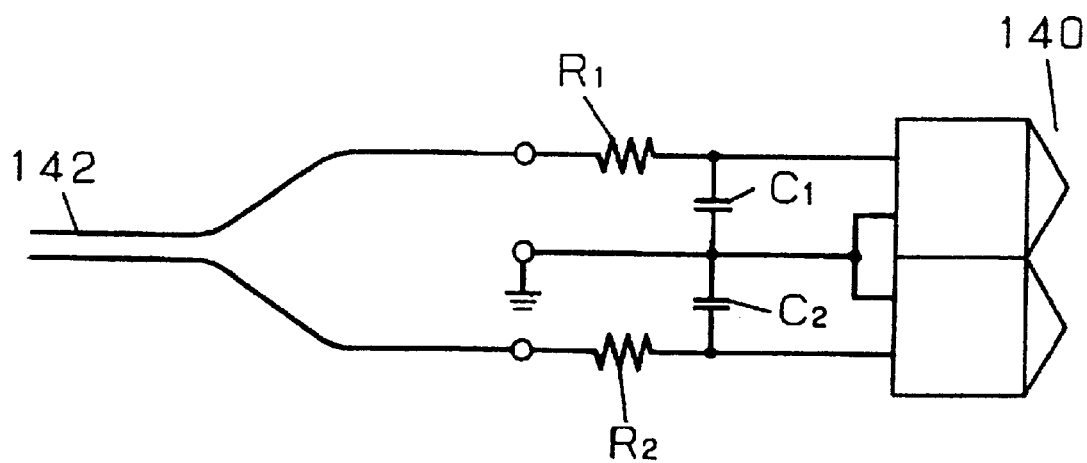
FIG. 13 is the electrical circuit diagram of the conventional cassette adaptor.

Now a fourth embodiment of the cassette adaptor of the present invention will be described below with reference to FIGS. 10 and 11. FIG. 10 is a perspective view showing a head cover unit 89 of a cassette adaptor of the fourth embodiment. FIG. 11 is a plan view showing an internal structure of a housing of the cassette adaptor of the fourth embodiment. The cassette adaptor of the fourth embodiment is a variation of the cassette adaptor of the first embodiment and the second embodiment wherein a modification to be described later is applied. Constituent parts according to the fourth embodiment having the same functions and configurations as those in the other embodiments are assigned with the same numerals and description thereof will be omitted.

In the cassette adaptor of the fourth embodiment, the dummy tape members 50, 51 of the first embodiment or the dummy tape members 72, 74 of the second embodiment are not provided, and the dummy tape 46 is provided instead to run in front of the magnetic head 58. FIG. 10 is a perspective view showing the dummy tape 46 guided by the dummy tape guides 54a, 54b on one side to run in front of the magnetic head 58, then guided between the other dummy tape guides 55a, 55b.

In the cassette adaptor of the fourth embodiment, as shown in FIG. 11, the dummy tape 46 is set to wind on the outer periphery of the reel 24 counterclockwise, wind around the roller 16a clockwise and then wind around the roller 16b and the tape roller 20a counterclockwise. After winding around the tape roller 20a, the dummy tape 46 runs between the left dummy tape guides 54a, 54b of the head cover unit 89, runs in front of the magnetic head 58 and runs between the right dummy tape guides 55a, 55b.

The dummy tape 46 which runs in front of the magnetic head 58 as shown in FIG. 10 winds around the tape roller 20b counterclockwise and winds around the roller 16c clockwise in the cassette adaptor shown in FIG. 11. Then the dummy tape winds around the surface of the right reel 26 counterclockwise, around the roller 16d counterclockwise, around the roller 16e clockwise, around the right reel 26 and around the left reel 24 counterclockwise to return. Thus as the roller 16c is pressed upward in X2 direction in FIG. 11 by the urging force of the tension spring 44, tension is applied to the dummy tape 46 wound around the roller 16c.

In the fourth embodiment, the ribs 50b, 51b of the first embodiment or the head guides 72b, 74b of the second embodiment may be brought up to the reproduction head 90 either via the dummy tape 46 or in direct contact therewith.

In case the cassette adaptor of the fourth embodiment configured as described above is mounted in the cassette tape reproduction apparatus similarly to the first embodiment and the second embodiment, similar functions as those of the dummy tape members 50, 51 of the first embodiment or the dummy tape members 72, 74 of the second embodiment are achieved. When the dummy tape 46 of the fourth embodiment enters between the tape guides 92 of the reproduction head 90 of the cassette tape reproduction apparatus, the force applied to the dummy tape 46 is transmitted to the dummy tape guides 54a, 54b, 55a, 55b thereby to move the head cover unit 89. As a result, the magnetic head 58 moves in the tape width direction thereby to oppose the reproduction head 90. In the condition that the cassette adaptor of the fourth embodiment is mounted in the cassette tape reproduction apparatus, the dummy tape 46 constantly runs in front of the reproduction head 90. Therefore, the magnetic head 58 of cassette adaptor of the fourth embodiment does not need a protective tape for preventing impairment due to contact with the reproduction head 90.

The cassette adaptors of the embodiments described above are examples of the present invention, and the cassette adaptor of the present invention may be modified and configured in various forms. Shapes and number of component parts described for the embodiments are not limited to those of the embodiments described above.

The cassette adaptor of the present invention may be configured by combining the component parts of the first through the fourth embodiments.

The embodiments described above have been described in the form of compact cassette tape or an apparatus using the same, but the present invention is not limited to a compact cassette tape, and can be applied to any media in the form of tape housed in a cassette and apparatuses using the same.

Further, the input signal in the cassette adaptor of the present invention is not limited to the compact disc reproduction apparatus, and can be used in any apparatuses which can reproduce audio signals.

As described above, in the cassette adaptor of the present invention, when inserted into the cassette tape reproduction apparatus, the dummy tape members or the dummy tape are inserted into the mating tape guide and the signal-output magnetic head guided by the tape guide can be accurately aligned with the mating reproduction head in the direction of tape width.

Further according to the present invention, the signal-output magnetic head and the dummy tape members can be aligned easily during assembly.

Also according to the present invention, the signal-output magnetic head can be positioned with reference to the reference surface of the mating tape guide.

Also according to the present invention, the signal-output magnetic head can be positioned accurately in the tape running direction with respect to the reproduction head of the cassette tape reproduction apparatus.

According to the cassette adaptor of the present invention, since the head core of the signal-output magnetic head can be disposed at the optimum position in both the tape width direction and the tape running direction with respect to the mating reproduction head, there occurs no crosstalk between the reproduction head and the magnetic head thus making it possible to transmit signals most efficiently.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A cassette adaptor comprising:
   a housing having a shape mountable interchangeably with an ordinary cassette tape in a cassette tape reproduction apparatus having a reproduction head;
   a magnetic head for outputting a signal which is held swingably within a reproduction head insertion opening of said housing, and which transmits signals to said reproduction head of said cassette tape reproduction apparatus;

a head holder, which accommodates said magnetic head to have a predetermined positional relationship relative to said reproduction head insertion opening into which said reproduction head of said cassette tape reproduction apparatus is inserted, and which has a plurality of tape guides disposed proximate to said magnetic head; and a dummy tape frame, which has a plurality of fixed dummy tape members which fit into said plurality of tape guides formed on opposite lateral sides of a front surface of said magnetic head, and which is fixed to said head holder; wherein reproduction apparatus tape guides of said cassette tape reproduction apparatus and said fixed dummy tape members engage with each other when said cassette adaptor is inserted into said cassette tape reproduction apparatus, and said magnetic head moves into opposing alignment with said reproduction head of said cassette tape reproduction apparatus due to the interaction between the dummy tape frame and the reproduction head when said magnetic head is laterally misaligned with said reproduction head.

2. The cassette adaptor in accordance with claim 1, wherein said dummy tape frame has a plurality of head guides having a concave shape and a radius of curvature substantially the same as or slightly larger than the radius of curvature of the front surface of said reproduction head, so as to urge said magnetic head in the tape running direction and into contact with said reproduction head of said cassette tape reproduction apparatus.

3. The cassette adaptor in accordance with claim 1, wherein two ribs are provided on the right and left of the front surface of said magnetic head so as to urge said magnetic head in the tape running direction and into contact with said reproduction head of said cassette tape reproduction apparatus.

4. The cassette adaptor in accordance with claim 1, wherein said magnetic head is urged toward a reference surface side of said reproduction apparatus tape guides of said cassette tape reproduction apparatus.

5. A cassette adaptor comprising:

a housing having a shape mountable interchangeably with an ordinary cassette tape in a cassette tape reproduction apparatus having a reproduction head;

a magnetic head for outputting a signal for transmission to said reproduction head of said cassette tape reproduction apparatus;

a head holder which is held swingably within a reproduction head insertion opening of said housing, and which accommodates said magnetic head; and a dummy tape frame, which is fixed to said head holder, and which has a pair of fixed dummy tape members disposed on opposite lateral sides of a front surface of said magnetic head so as to maintain a predetermined positional relationship with said magnetic head, wherein reproduction apparatus tape guides of said cassette tape reproduction apparatus and said dummy tape members engage with each other when said cassette adaptor is inserted into said cassette tape reproduction apparatus, and said magnetic head moves into opposing alignment with said reproduction head of said cassette tape reproduction apparatus due to the interaction between said dummy tape frame and said reproduction head when said magnetic head is laterally misaligned with said reproduction head.

6. The cassette adaptor in accordance with claim 5 wherein said dummy tape frame has head guides having a concave shape and a radius of curvature substantially the same as or slightly larger than the radius of curvature of the front surface of said reproduction head, so as to urge said magnetic head in the tape running direction and into contact with said reproduction head of said cassette tape reproduction apparatus.

7. The cassette adaptor in accordance with claim 5 wherein two ribs are provided on the right and left of the front surface of said magnetic head so as to urge said magnetic head in the tape running direction and into contact with said reproduction head of said cassette tape reproduction apparatus.

8. The cassette adaptor in accordance with claim 5 wherein said magnetic head is urged toward a reference surface side of said reproduction apparatus tape guides of said cassette tape reproduction apparatus.

9. A tape adaptor comprising:

a housing having an opening for receiving a reproduction head from a tape player;

a magnetic head swingably mounted in said housing and at least substantially enclosed in said housing for outputting a signal to said tape player via said reproduction head, said magnetic head being automatically laterally displaced when a front surface of said magnetic head is laterally misaligned with said reproduction head, said magnetic head being positioned proximate to said opening in said housing;

a head holder mountably supporting said magnetic head in said housing and positioning said magnetic head in a predetermined position relative to said opening, said head holder having a plurality of dummy tape members each bearing a protuberance extending outwardly past said front surface of said magnetic head; and each said protuberance engaging said reproduction head when said reproduction head is laterally misaligned with said magnetic head and causing said magnetic head to move into opposing lateral alignment with said reproduction head of said tape player.

* * * * *